Sept. 2, 1952  S. C. BECKER  2,609,020
SAW HANDLE
Filed Feb. 23, 1951
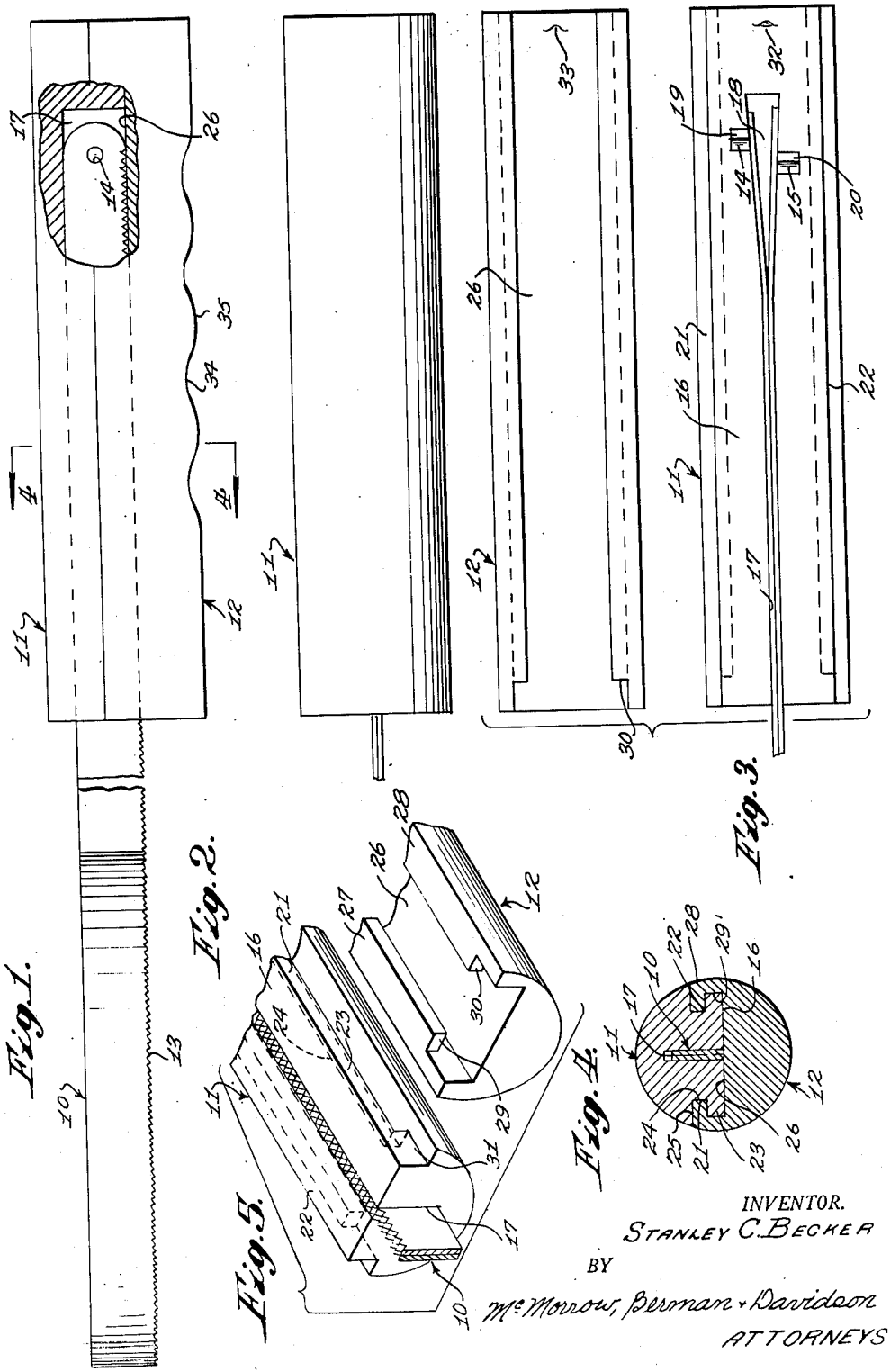
INVENTOR.
STANLEY C. BECKER
BY
McMorrow, Berman & Davidson
ATTORNEYS Patented Sept. 2, 1952

2,609,020

UNITED STATES PATENT OFFICE 2,609,020

SAW HANDLE

Stanley C. Becker, New Castle, Ind.

Application February 23, 1951, Serial No. 212,458

4 Claims. (Cl. 145—108)

This invention relates to tool assemblies including detachable handles, and more particularly to a scraper tool having a detachable handle.

It is among the objects of the invention to provide an improved tool assembly including a detachable handle which can be quickly and easily attached to and removed from a tool blade and provides a secure attachment with the blade so that the blade cannot become loosened or separated from the handle during use of the tool; which requires no screws or other separate fasteners for the attachment of the handle to the blade; which provides a comfortable grip for the hand of the person using the device; and which is simple, strong and durable in construction, economical to manufacture from readily available materials, and neat and attractive in appearance.

Other objects and advantages will become apparent from a consideration of the following description and the appended claims in conjunction with the accompanying drawing, wherein:

Figure 1 is a side elevational view of a tool assembly illustrative of the invention, a portion being broken away and shown in cross-section to better illustrate the construction thereof;

Figure 2 is a top plan view of the tool assembly illustrated in Figure 1;

Figure 3 is a plan view of the two parts of the two-part tool handle shown in separated condition;

Figure 4 is a transverse cross-sectional view on the line 4—4 of Figure 1; and

Figure 5 is a fragmentary perspective view showing the two parts of the tool handle in separated condition, with a scraping tool mounted in one handle part.

With continued reference to the drawing, the tool comprises, in general, a scraper blade 10 and a detachable handle including two separable parts 11 and 12.

The scraper blade 10, as illustrated, is a flexible meat saw blade of well known construction, but it is to be understood that other flexible strips may be mounted in the detachable handle and used as scraper tools without in any way exceeding the scope of the invention.

The blade 10 has saw teeth 13 along one edge thereof, and has connecting pins 14 and 15 projecting laterally therefrom, one near each end thereof, as particularly illustrated in Figure 2. The blade is curved at its mid-length location and has its two end portions received in the handle, so that it provides a loop extending outwardly of one end of the handle. A scraper of this character is particularly useful in removing bone dust and tallow smear from meat cuts which have been cut on an electric band saw to improve the appearance and taste of the meat cuts and render them more resistent to spoiling.

The handle part 11 comprises an elongated body of substantially semicylindrical shape having a flat surface 16 and a transversely rounded surface opposite the flat surface. This handle part may be formed of any suitable material, such as wood, synthetic resin plastic, metal or hard rubber, and may be formed either solid or hollow, as may be desired.

The handle part 11 has at least a solid center portion, and a groove 17 of elongated, rectangular shape is provided in this center portion extending medially of the handle part 11 from one end to a location intermediate the length of the handle part, but near the other end thereof and opening along one edge to the flat surface 16. This groove 17 is disposed substantially perpendicular to the flat surface 16 and has a depth substantially equal to the width of the flexible saw blade 10 and a thickness or width equal to substantially twice the thickness of the saw blade. From a location adjacent its inner end the outer sides of the groove diverge from each other and a wedge-shaped portion 18 is disposed between the two divergent outer sides of the grove to constitute the inner or adjacent sides of the groove and provide two divergent groove portions near the inner end of the groove. Recesses 19 and 20 are provided in the handle part 11 extending laterally one from each of the divergent groove parts at the outer sides of these parts and respectively receiving the corresponding portions of the attaching pins 14 and 15 on the tool blade 10. When the tool blade is looped, as described above, at its two end portions placed in side-by-side relationship in the groove 17 with the pins 14 and 15 received in the recesses 19 and 20, the blade or scraping tool is firmly held against movement longitudinally of the handle part 11.

The handle part 11 is provided with tongue-and-groove formations 21 and 22 extending one along each edge of the flat surface 16 thereof. Each of these tongue-and-groove formations, as particularly illustrated for the formation 21, comprises a tongue 23 of rectangular cross-sectional shape having one side flush with the flat surface 16 of the part 11 and having its outer edge spaced inwardly from the cylindrical surface including the transversely rounded outer surface of this handle part, and a groove 24, also of rectangular cross-sectional shape, at the side of the tongue 23 remote from the flat surface 16 of the handle part, the side of the groove opposite the open side thereof constituting a flat surface 25 extending longitudinally of the handle part and inwardly from the adjacent edge of the transversely curved surface of the part. The formation 22 is similar to the formation 21, and is opposed to the latter across the width of the handle part 11.

The handle part 12 also comprises a body of elongated and substantially semicylindrical shape having a flat surface 26 and a transversely rounded outer surface. The flat surface 26 constitutes the bottom surface of a recess extending longitudinally of the part 11 and this part is provided with tongue-and-groove formations 27 and 28 extending one along each edge of the flat surface 26. Each of these tongue-and-groove formations 27 and 28 comprises, as indicated for the formation 28, an inwardly directed tongue 29 of rectangular cross-sectional shape spaced from the flat surface 26 and a groove 29' also of rectangular cross-sectional shape, and disposed between the tongue 29 and the flat surface 26.

The outer surfaces of the tongue portions of the tongue-and-groove formations 27 and 28 extend from the edge of the transversely rounded surface of the corresponding handle part to the inner edges of the tongue, and are disposed in a common plane which is spaced from the substantially parallel to the flat surface 26, and also has a width substantially equal to the width of the bottom surfaces, as indicated at 25, of the grooves, as indicated at 24, of the tongue-and-groove formations 21 and 22 of the handle part 11.

The tongue-and-groove formations 21 and 22 are complementary to the tongue-and-groove formations 27 and 28 and slidably receive these latter groove formations to secure the two handle parts together with the flat surfaces 16 and 26 juxtaposed.

When the two handle parts are thus associated, the tool blade 10 is held in the handle and cannot be loosened or separated from the handle until the handle parts are separated by sliding them longitudinally relative to each other.

The tongues of the tongue formations 27 and 28 terminate somewhat short of the end of the part 11 at that end of the handle from which the blade projects, as indicated at 30 in Figure 2, and the grooves of the tongue-and-groove formations 21 and 22 of the handle part 11 terminate short of the end of this handle part to which slot 17 extends to provide abutments, as indicated at 31 which engage the ends of the tongues of the formations 27 and 28 to limit sliding movement of the handle part 12 along the part 11 toward the end of the part 11 to which the slot 17 extends to a position in which the two handle parts are substantially coterminous.

Complementary locking elements 32 and 33 are provided on the flat surfaces 16 and 26 of the handle parts 11 and 12, respectively, and mutually engage when the two handle parts are associated and in substantially coterminous relationship to each other to releasably lock the handle parts in this relationship.

The handle part 12 may also be formed of any suitable material, such as wood, synthetic resin plastic, metal or hard rubber, and may be made either solid or hollow, as may be desired.

The handle part 12 is preferably provided intermediate the length of the rounded surface thereof with rounded grooves and ridges 34 and 35 which extend transversely of the handle part and are alternated longitudinally thereof to provide a secure finger grip for the handle so that a pulling force can be exerted on the scraper blade 10 without pulling the handle out of the hand of the person using the tool.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A detachable tool handle comprising a first part of substantially semicylindrical shape having a flat surface and a transversely rounded surface and having a tool receiving groove extending medially of the longitudinal edges of the flat surface from one end to a location intermediate the length of said part and opening along one side to said flat surface, said groove being divided into two diverging grooves near the inner end thereof and said first part also having tongue-and-groove formations extending one along each longitudinal edge of said flat surface, and a second part of substantially semicylindrical shape having a flat surface and a transversely rounded surface and having tongue-and-groove formations extending one along each longitudinal edge of the flat surface thereof and complementary to the tongue-and-groove formations on said first part to slidably receive the tongue-and-groove formations on said first part and secure the two parts together with the flat surfaces thereof juxtaposed, and complementary locking means carried on the flat surfaces of said first and second parts to releasably lock said parts in substantially coterminous relationship to each other.

2. A detachable tool handle comprising a first part of elongated shape having on one side a flat surface extending from one end to the other thereof, said first part having a tool receiving groove extending medially of the longitudinal edges of the flat surface from one end to a location intermediate the length of said flat surface and opening to said flat surface and to said one end of said first part, said first part also having tongue-and-groove formations extending one along each longitudinal edge of the flat surface thereof and abutment formations at the ends of said tongue-and-groove formations at said one end of said first part, and a second part superposed on said first part and having a flat surface extending from one end to the other thereof and juxtaposed to the flat surface of said first part to cover said tool receiving groove, said second part also having tongue-and-groove formations extending one along each longitudinal edge of the flat surface thereof and slidably receiving the tongue-and-groove formations on said first part, the tongue-and-groove formations on said second part being shorter than said second part and engaging at their corresponding ends the abutment formations on said first part to limit movement of said parts in one direction to a substantially coterminous relationship of said parts.

3. A detachable tool handle comprising a first part of elongated shape having a flat surface extending from one end to the other thereof and having a tool receiving groove extending medially of the longitudinal edges of said flat surface from one end to a location intermediate the length of said first part and opening to said flat surface and said one end, said first part also having tongue-and-groove formations extending one along each longitudinal edge of the flat surface thereof, a second part superposed on said first part and having a flat surface extending from one end to the other end thereof and juxtaposed to the flat surface of said first part to cover said tool receiving groove, said second part also having tongue-and-groove formations extending one along each longitudinal edge of the flat surface thereof and slidably receiving the tongue-and-groove formations on said first part, and abutment means carried by said first and second parts brought into engagement with each other when said parts are moved longitudinally of each other to a substantially coterminous relationship to limit relative longitudinal movement of the parts to such substantially coterminous relationship.

4. A detachable tool handle comprising a first part of elongated shape having a flat surface extending from one end to the other thereof and having a tool receiving groove extending medially of the longitudinal edges of said flat surface from one end to a location intermediate the length of said first part and opening to said flat surface and said one end, said first part also having tongue-and-groove formations extending one along each longitudinal edge of the flat surface thereof, a second part superposed on said first part and having a flat surface extending from one end to the other end thereof and juxtaposed to the flat surface of said first part to cover said tool receiving groove, said second part also having tongue-and-groove formations extending one along each longitudinal edge of the flat surface thereof and slidably receiving the tongue-and-groove formations on said first part, abutment means carried by said first and second parts brought into engagement with each other when said parts are moved longitudinally of each other to a substantially coterminous relationship to limit relative longitudinal movement of the parts to such substantially coterminous relationship, and locking means carried by said parts and mutually engageable when said parts are brought to said substantially coterminous relationship to releasably lock said parts in said substantially coterminous relationship to each other.

STANLEY C. BECKER.

REFERENCES CITED

The following references are of record in the file of this patent:

UNITED STATES PATENTS

| Number | Name | Date |
| --- | --- | --- |
| 1,202,299 | Lutz | Oct. 24, 1916 |
| 2,331,638 | Taylor | Oct. 12, 1943 |